United States Patent [19]

Stenner

[11] Patent Number: 5,129,737
[45] Date of Patent: Jul. 14, 1992

[54] MOTOR BEARING AND BRACKET THEREFOR

[75] Inventor: Gustav H. Stenner, Jacksonville, Fla.

[73] Assignee: G. H. Stenner & Co., Jacksonville, Fla.

[21] Appl. No.: 646,193

[22] Filed: Jan. 28, 1991

[51] Int. Cl.⁵ .............................................. F16C 37/00
[52] U.S. Cl. .................................. 384/192; 384/214; 384/428; 384/438; 384/476
[58] Field of Search ............... 384/192, 438, 320, 476, 384/428, 214

[56] References Cited

U.S. PATENT DOCUMENTS

| | | | |
|---|---|---|---|
| 3,002,794 | 10/1961 | Bluemink | 384/214 |
| 3,070,409 | 12/1962 | Jakel | 384/214 |
| 4,910,424 | 3/1990 | Borcherding | 384/214 |
| 5,028,150 | 7/1991 | Kronenberger | 384/476 |

Primary Examiner—Lenard A. Footland
Attorney, Agent, or Firm—Arthur G. Yeager

[57] ABSTRACT

A plastic bracket and bearing assembly for a shaft of a fractional horsepower electric motor which includes a molded heat insulating plastic article having two or more feet attachable to the motor and spaced outwardly from a central hub having a recess for receiving a washer-shaped lubricating wick of fibrous material, spaced passageways in the bracket to provide oil to the wick, and a spherical self-aligning bearing block with a bore for supporting the motor shaft.

20 Claims, 1 Drawing Sheet

1

MOTOR BEARING AND BRACKET THEREFOR

BACKGROUND OF THE INVENTION

Fractional horsepower electric motors are generally small machines which during their operation generate a surprising amount of heat in the motor windings. This heat causes the lubricating oil to become thin and evaporate too quickly, and to cause damage to the bearings and the shaft of the motor and then to the motor itself. It is therefore extremely important to dissipate the heat away from the bearings to the maximum extent possible. One improvement has been to employ a fan on the motor shaft which will blow air over the bearing to assist in cooling it. Another improvement has been to employ metal bearing members in plastic housings. Still another improvement has been the use of porous bronze bearing members lubricated by oil passing through a fibrous wick which is in contact with the bearing. Typical of such improvements are those shown in U.S. Pat. Nos. 3,034,838; 3,037,822 and 3,934,953. None of these patents, however, shows an optimum combination of features for a small fractional horsepower electric motor.

It is an object of this invention to provide an improved bearing and bearing bracket for a small electric motor. It is another object of this invention to provide an improved bearing and bearing bracket for a fractional horsepower electric motor that generates considerable heat during operation. Still other objects will become apparent from the more detailed description which follows.

BRIEF SUMMARY OF THE INVENTION

This invention relates to a bearing and a bracket for the bearing. The bearing is for a shaft of a fractional horsepower motor and includes a bearing block, a lubrication wick and a plastic housing for the block and the wick; the bearing block being a solid cylindrical member with hemispherical ends and being symmetrical about a diametrical through bore; the wick being a washer-shaped member of fibrous material; and the housing including a central hub with a cylindrical recess adapted to accommodate the wick at its outer end and the bearing block at its inner end contiguous to the wick, a passageway connecting the inner portion with the atmosphere surrounding the housing, and at least two feet spaced apart from the hub each with a through bore to accommodate screw member to fasten the housing to the motor.

The bearing bracket comprises a housing with a cylindrical recess for receiving a generally cylindrical bearing block, in a press fit and adjoining the recess is an undercut portion for receiving a washer-shaped lubrication wick of fibrous material contiguous to the bearing block, the housing also having feet for attachment of the housing to the motor, and the plastic being a poor conductor of heat to inhibit evaporation of lubrication from the wick.

In specific and preferred embodiments of the invention the housing is made of a plastic that is a poor conductor of heat and has at least two feet that contact the electric motor and support the remainder of the housing spacedly away from the motor.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

This invention relating to a bearing and to a bearing bracket can best be described with reference to the attached drawings.

Figure 1:
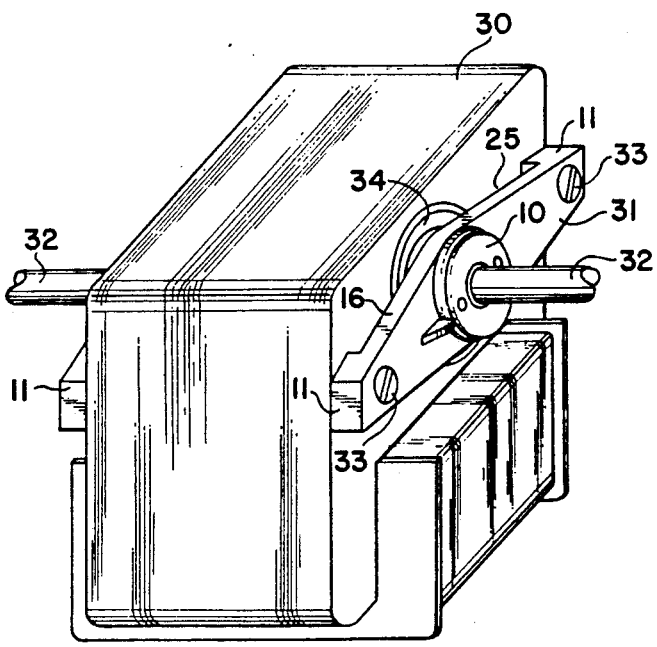
FIG. 1 is a schematic perspective view of a small electric motor with bearings of this invention employed thereon.

FIG. 1 shows schematically a small fractional horsepower electric motor 30 with the motor shaft 32 extending outwardly from opposite sides of the motor 30. A bearing bracket 31 containing internally a bearing block is positioned over the shaft 32 on each side of the motor 30 to support the shaft 32 in a free turning manner. Each bracket 31 has two feet 11 which are fastened to the motor 30 by screws 33. The main support member of the bearing bracket 31 is span 16 which is spaced away from motor 30 by the design of feet 11 so as to leave an air space 25 between the motor 30 and the bracket 31. The flow of air in space 25 helps to insulate the bearing from the heat generated by the motor windings. Normally a fan blade is attached to shaft 32 on one side of motor 30 with its blades designed to cause air currents to flow over motor 30 so as to cool motor 30. Rotor 34 of motor 30 turns with shaft 32 and is supported by a bearing block mounted internally in hub 10 of bracket 31.

Figure 2:
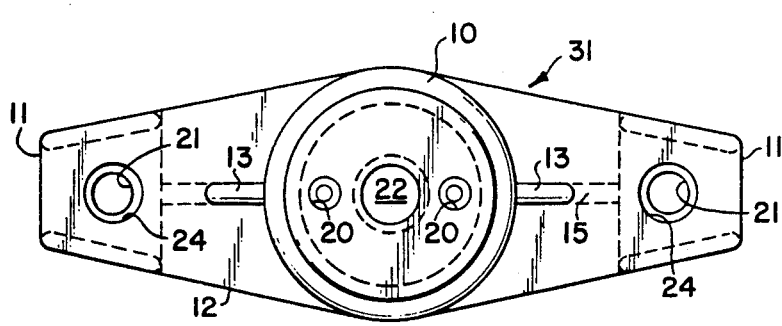
FIG. 2 is a top plan view of the bearing bracket of this invention.
Figure 3:
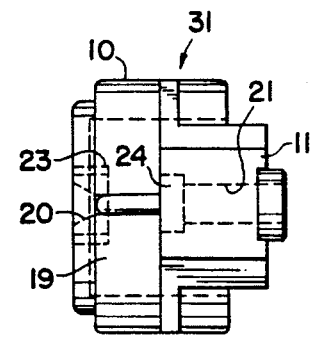
FIG. 3 is an end elevational view of the bearing bracket of this invention.
Figure 4:
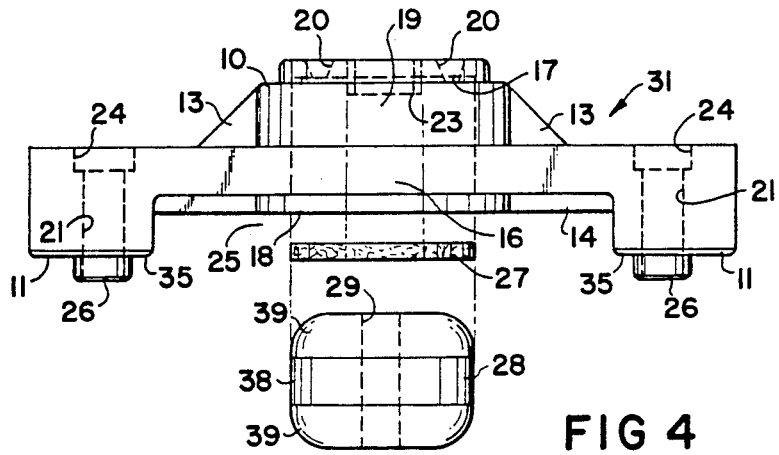
FIG. 4 is an exploded view of a front elevation of the bearing of this invention.

The bearing bracket 31 in FIG. 1 is shown in detail in FIGS. 2-4. Bracket 31 includes a central hub 10 having an internal recess 15 and at least two feet 11 spaced outwardly on opposite sides of hub 10. If there are two feet 11, they will be on diametrically opposite sides of hub 10. If there are three or more feet 11, they will be equally spaced radially around hub 10 but not necessarily on a diameter.

Each foot 11 is designed to rest against the motor to which it is fastened by a screw or rivet or bolt or the like via bore 21 and counterbore 24 to receive the head of the fastener element. Preferably, but not necessarily, a small locating flange 26 extends beyond the seating surface 35 of foot 11 to fit into the corresponding bore or threaded hole in motor 30. Except for the seating surface 35 of each foot 11, the remaining portion of bracket 31 is spaced away from and does not touch motor 30 other than at the shaft bearing. Feet 11 are joined by a main support span 16 to central hub 10 so as to leave an air space 25 between the bracket 31 and motor 30. Preferably, there also is a stiffening or reinforcing rib 14 extending between each foot 11 and hub 10 on the underneath side 37 of bracket 31. Hub 10 is also reinforced by a plurality of short angle ribs 13 on the upper surface 36 of main support span 16 extending laterally toward each foot 11, respectively. Ribs 13 and 14 are not critical to the design of the bracket of this invention and may be modified or eliminated in designs where other means are employed to strengthen the structure of the bearing bracket 31.

Hub 10 is designed to contain the bearing for shaft 32. While the bearing may be a ball bearing assembly or a roller bearing assembly or a journal or block bearing, the latter is preferred because of simplicity and inexpensiveness. Shown in FIG. 4 in an exploded arrangement is a bearing block 28 with a central bore 29 to receive shaft 32. Bearing block 28 is pressed into recess 15 in bracket 31 so as to be stationary with respect to bracket 31. It is entirely acceptable for bearing block 28 to be fastened into bracket 31 by other means such as cementing, by set screws, etc., but a frictional holding is preferred because of ease of assembly. Recess 15 is generally cylindrical so as to match and receive cylindrical surface 38 of bearing block 39. Preferably, the two end portions 39 of bearing block 28 are hemispherical so as to provide a small amount of alignment adjustability to bearing block 28. This is typical for self-aligning block bearings or journal bearings to compensate for minor discrepancies between the alignment of shaft 32 and the alignment of bore 29 in bracket 31.

Recess 15 is shown to be cylindrical from inner end 18 to outer end 19. At outer end 19 there is a passageway 22 through which shaft 32 extends outwardly of bracket 31. At outer end 19 of recess 15 there is a seat for lubrication wick 27 which is a washer-shaped piece of fibrous material, which may be natural, synthetic, metallic, or the like capable of forming a reservoir for lubricating oil to lubricate shaft 32 rotating in bearing block 28. Preferably, bearing block 28 is a porous bronze material capable of transmitting oil through the solid block in the pores of the bronze. If bearing block 28 is nonporous, the lubricating oil must flow around the outside of block 28 and into the interface between shaft 32 and central bore 29. The outer end 19 of bracket 31 is pierced by one or more passageways 20 through which oil may be fed into wick 27 when needed. Preferably wick 27 is washer-shaped and held in place by recess 15 and by downwardly depending flange 23 at shaft passageway 22. Other shapes of wick 27 and means for retaining those shapes in place are operable in this invention. Furthermore, the shape of recess 15 may be modified, e.g., to include a hemispherical seat for the outer end of bearing block 28, even though this might require other modifications to provide proper lubrication channels for shaft 32.

The bearing assembly of bracket 31, bearing block 28, and wick 27 wherein bracket 31 is made of a molded plastic that is a poor conductor of heat is a great improvement over similar bearing structures where bracket 31 is a metal. Metal conducts heat very well and accordingly conducts the heat from the motor windings (temperatures of about 185°-300° F.) very efficiently to bearing block 28 which causes lubrication problems. The oil becomes heated which breaks down its viscosity and its lubricating characteristics, and it causes the oil to evaporate to dryness much more rapidly than when its temperature is reduced. The bearing bracket of this invention is made of a heat insulator which protects the bearing and the lubricating oil from the high temperatures developed by the motor, leaving the bracket cool to the touch (approx. 100°-150° F.). Preferred plastic materials are thermoplastics such as polyacetales, polycarbonates, polyamides, polyolefins and the like. A particularly desirable plastic is ULTEM made and sold by General Electric Co. The plastic must be a poor conductor of heat, but also must be structurally strong so as to hold the rotor shaft 32 in a steady position. Reinforced plastic materials are also operable.

A second feature of this bearing bracket is that it may be designed to be as small as the natural strength of the plastic will permit. Small sizes are advantageous in that there is less of the bracket to receive heat from the motor, and therefore less heat to handle, since the remainder will be dissipated to the surrounding atmosphere by radiation and convection. Corresponding applications in metal or in plastic show that the volume of the plastic bracket may be only about 50-75% of the volume of a corresponding bracket in white metal. Similarly the weight of the plastic bracket may be from 25% to 75% of the weight of a corresponding white metal bracket.

It is, of course, important to the design of the bearing bracket of this invention that the physical contact between the bearing bracket and the motor be kept to a minimum. This is accomplished by designing the bearing with a plurality of feet having minimum area of actual contact with the motor while keeping the remainder of the bearing bracket spaced away from the motor. These criteria provide for a minimum conduction of heat from the motor to the bearing and the lubricant. In the present design this is accomplished by minimizing the area of contact between surface 35 of feet 11 and motor 30, and by maximizing the air space 25 between main span 16 of bracket 31 and motor 30.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A molded plastic bearing bracket for an electric motor shaft having a housing with a cylindrical recess for receiving a generally cylindrical bearing block in a press fit, and adjoining said recess an undercut portion for receiving a washer-shaped lubrication wick of fibrous material contiguous to said bearing block, said housing also having feet for attachment of said housing to said motor, said plastic being a poor conductor of heat.

2. The bracket of claim 1 wherein said housing includes a passageway therethrough communicating said recess with the atmosphere surrounding the bracket.

3. The bracket of claim 1 wherein said feet are at least two in number with each foot having a passageway for an attachment screw to connect said bracket to said motor.

4. The bracket of claim 1 wherein said housing includes a central hub with said recess positioned to accommodate said bearing closely adjacent to said motor and said wick contiguous to said bearing on the side opposite to said motor; said housing having two feet spaced outwardly from said hub on opposite sides thereof, each foot having a counterbored hole therethrough for an attachment screw.

5. The bracket of claim 1 further comprising at least one lubrication passageway extending through said housing and communicating between the atmosphere adjacent said housing and said undercut portion for supplying lubrication access to a wick adapted to be positioned in said undercut portion.

6. A molded plastic bearing bracket for an electric motor shaft comprising an elongated housing having a pair of spaced end portions and a cylindrical recess generally medially thereof for receiving a generally cylindrical bearing block adapted to be press fit into said recess, an undercut portion in said housing adjoining said recess for receiving a washer-shaped lubrication wick of fibrous material contiguous to a bearing block, a pair of spaced feet adjacent respective said end portions for attachment of said housing to a motor, said plastic material of said bracket being a poor conductor of heat to minimize evaporation of a lubrication wick.

7. The bracket of claim 6 wherein said housing includes a passageway therethrough communicating between said recess and the atmosphere surrounding the bracket.

8. The bracket of claim 6 wherein each of said pair of feet includes a passageway for an attachment screw to connect said bracket to a motor.

9. The bracket of claim 6 wherein said housing includes a central hub with said recess positioned to accommodate the bearing sandwiched between a said motor and a wisk, said pair being spaced outwardly from said hub on opposite sides thereof, each foot having a counterbored hole therethrough for an attachment screw.

10. The bracket of claim 6 further comprising at least one lubrication passageway extending through said housing and communicating between the atmosphere adjacent said housing and said undercut portion for supplying lubrication access to a wick adapted to be positioned in said undercut portion.

11. A shaft bearing for a fractional horsepower electric motor comprising a bearing block, a lubrication wick and a plastic housing for said block and said wick; said bearing block being a solid cylindrical member with hemispherical ends and being symmetrical, about a diametrical through bore; said wick being a washer-shaped member of fibrous material; and said housing including a central hub with a cylindrical recess adapted to accommodate said wick at its outer end and said bearing block at its inner end contiguous to said wick, a passageway connecting said recess at its outer end with the atmosphere surrounding said housing, and at least two feet spaced apart from said hub each with a through bore to accommodate a screw member to fasten said housing to said motor.

12. The bearing of claim 11 wherein said plastic is a poor conductor of heat.

13. The bearing of claim 11 wherein the only physical contacts between said motor and said bearing are between said feet and said motor and between said bearing and said shaft.

14. The bearing of claim 11 wherein said housing is spaced outwardly from said motor except at said feet.

15. The bearing of claim 11 further comprising at least one lubrication passageway extending through said hub adjacent to and extending substantially parallel with said shaft passageway, said at least one lubrication passageway communicating between said wick and the atmosphere adjacent said hub.

16. A shaft bearing for a fractional horsepower electric motor comprising a bearing block, a lubrication wick and a plastic housing for said block and said wick; said bearing block being a solid cylindrical member with hemispherical ends and being symmetrical about a diametrical through bore; said wick being a washer-shaped member of fibrous material; and said housing including a generally central hub with a cylindrical recess for accommodating said wick at its outer end and said bearing block at its inner end contiguous to said wick, a shaft passageway connecting said recess at its outer end with the atmosphere surrounding said housing for accommodating a shaft of a motor therethrough, and at least two spaced feet extending generally oppositely and outwardly from said hub each with a through bore to accommodate a screw member to fasten said housing to a motor.

17. The bearing of claim 16 wherein the plastic material of said housing is a poor conductor of heat.

18. The bearing of claim 16 wherein said bearing contacts a motor with said feet and said bearing block contacts a shaft of a motor.

19. The bearing of claim 16 wherein said housing is spaced outwardly from a motor except at said feet.

20. The bearing of claim 16 further comprising at least one lubrication passageway extending through said hub adjacent to and extending substantially parallel with said shaft passageway, said at least one lubrication passageway communicating between said wick and the atmosphere adjacent said hub.

* * * * *